United States Patent

Kanbara et al.

Patent Number: 5,745,800
Date of Patent: Apr. 28, 1998

[54] CAMERA SHAKE COMPENSATION DEVICE

[75] Inventors: Tetsuro Kanbara, Sakai; Masayuki Ueyama, Takarazuka, both of Japan

[73] Assignee: Minolta Co., Ltd., Osaka, Japan

[21] Appl. No.: 553,977

[22] Filed: Nov. 6, 1995

[30] Foreign Application Priority Data

Nov. 8, 1994 [JP] Japan ................................. 6-273757

[51] Int. Cl.$^6$ .......................... G03B 1/18; H04N 5/228
[52] U.S. Cl. .................................... 396/55; 348/208
[58] Field of Search .......................... 348/208; 396/55

[56] References Cited

U.S. PATENT DOCUMENTS

| | | | |
|---|---|---|---|
| 5,172,276 | 12/1992 | Ueyama et al. | 359/813 |
| 5,182,671 | 1/1993 | Kitagishi et al. | 359/557 |
| 5,217,558 | 6/1993 | Hamano | 359/557 |
| 5,225,941 | 7/1993 | Saito et al. | |
| 5,416,558 | 5/1995 | Katayama et al. | 354/446 |
| 5,463,443 | 10/1995 | Tanaka et al. | 354/430 |
| 5,526,192 | 6/1996 | Imura et al. | 359/813 |

FOREIGN PATENT DOCUMENTS 63-11074  1/1988  Japan.

*Primary Examiner*—Cassandra C. Spyrou
*Assistant Examiner*—Daniel Chapik
*Attorney, Agent, or Firm*—Burns, Doane, Swecker & Mathis, LLP

[57] ABSTRACT

A camera shake compensation device for a photo-taking optical system includes a shake compensation optical element having an optical axis; a first holding member that holds the shake compensation optical element; a drive source that drives the first holding member in order to cause the shake compensation optical element to move such that the optical axis of the shake compensation optical element becomes eccentric with respect to an optical axis of the photo-taking optical system; and a second holding member that holds the first holding member by means of the drive source so that the second holding element can move along a photo-taking optical axis together with the first holding member and drive source during focusing or zooming by the photo-taking optical system.

18 Claims, 11 Drawing Sheets

CAMERA SHAKE COMPENSATION DEVICE

BACKGROUND OF THE INVENTION

1. Field of the Invention

The present invention pertains to a camera shake compensation device, and more particularly, to a camera shake compensation device which reduces image blurriness caused by camera shake, e.g., vibration during photo-taking when the camera is being held in the hands.

2. Description of the Related Art

Conventionally, most failures in photo-taking have been caused by camera shake and out of focus conditions. However, in recent years, auto-focus mechanisms have come to be used in most cameras, and the focusing accuracy of the auto-focus mechanisms has increased, which has almost eliminated photo-taking failures caused by out of focus conditions.

On the other hand, the type of lens typically mounted in a camera has changed from a single focal point lens to a zoom lens. At the same time, zoom lenses are being made increasingly high-powered and telescopic, which has added to the possibility of camera shake. As a result, the primary cause of failure in photo-taking is now camera shake. Consequently, a camera shake mechanism has become desirable for the lenses, and for zoom lenses in particular.

The applicant for the present invention disclosed in U.S. Pat. No. 5,172,276 a lens mount equipped with a camera shake compensation device. This lens mount comprises a first frame member which holds the camera shake compensation optical system and performs compensation as to said optical system and a second frame member which moves along the optical axis during zooming and focusing. As a result of this construction, the mechanisms to drive each of the frame members can be constructed simply. Furthermore, because the first frame member is placed on the second frame member, the first frame member moves together with the second frame member along the optical axis during zooming and focusing, and it is not necessary to move the camera shake compensation mechanism itself along the optical axis. Consequently, the camera shake compensation mechanism need only have a construction intended for camera shake compensation, and the construction thereof may thus be made quite simple.

However, the drive source of said camera shake compensation device (comprising a motor, etc.) is fixed to a fixed barrel separate from the camera shake compensation optical system. Therefore, even when the camera shake compensation mechanism moves along the optical axis together with the camera shake compensation optical system during zooming and focusing, the camera shake compensation drive source does not move. In other words, said device is constructed such that regardless of the movement of the camera shake compensation mechanism along the optical axis, the drive power from the camera shake compensation drive source can be transmitted to the first frame member. However, such a camera shake compensation mechanism has a large number of components and is complex in construction, making it difficult to make the entire device compact. In addition, because gears, etc. are used, it can be difficult to perform camera shake compensation with high accuracy due to clearance.

SUMMARY OF THE INVENTION

An object of the present invention is to resolve the problems described above.

Another object of the present invention is to provide a camera shake compensation device which has a smaller number of components and a simple construction.

Yet another object of the present invention is to provide a compact camera shake compensation device.

Yet another object of the present invention is to provide a camera shake compensation device capable of performing highly accurate camera shake compensation.

These and other objects of the present invention will become apparent from the description and drawings below.

These and other objects are attained through a camera shake compensation device that compensates for camera shake during photo-taking by moving the camera shake compensation optical system, which comprises a part of the photo-taking optical system, such that it becomes eccentric relative to the optical axis of said photo-taking optical system, wherein said camera shake compensation device comprises a first holding member that holds said camera shake compensation optical system, a camera shake compensation drive source that drives said first holding member in order to cause said camera shake compensation optical system to move such that its optical axis becomes eccentric, and a second holding member that holds said first holding member by means of said camera shake compensation drive source and that can move along said optical axis together with said first holding member and camera shake compensation drive source during focusing or zooming by said photo-taking optical system.

In addition, said objects are attained through a camera shake compensation device that compensates for camera shake during photo-taking by tilting the optical axis of the camera shake compensation optical system, which comprises a part of the photo-taking optical system, relative to the optical axis of said photo-taking optical system, wherein said camera shake compensation device comprises a holding member that holds said camera shake compensation optical system as well as an optical axis-oriented drive source that drives said holding member by providing it at two or more locations with different amounts of drive power in the direction along the optical axis of said photo-taking optical system in order to tilt the optical axis of said camera shake compensation optical system and that drives said holding member by providing it at two or more locations with the same amounts of drive power in the direction along said optical axis in order to perform focusing or zooming by said photo-taking optical system.

In the camera shake compensation device described above, it is preferred that the camera shake compensation drive source be constructed using impact actuators.

BRIEF DESCRIPTION OF THE DRAWINGS

These and other objects and features of the present invention will become apparent from the following description of the preferred embodiments thereof taken in conjunction with the accompanying drawings, in which.

In the following description, like parts are designated by like reference numbers throughout the several drawing.

DETAILED DESCRIPTION OF THE PREFERRED EMBODIMENTS

Embodiments of the present invention will be explained below with reference to the drawings.

First embodiment

The camera shake compensation device of the first embodiment will be explained with reference to FIGS. 1 through 5. The camera shake compensation device of the first embodiment is of a type in which the camera shake compensation optical system is moved while the optical axis of the camera shake compensation optical system and the optical axis of the photo-taking optical system are kept parallel to each other.

Figure 1:
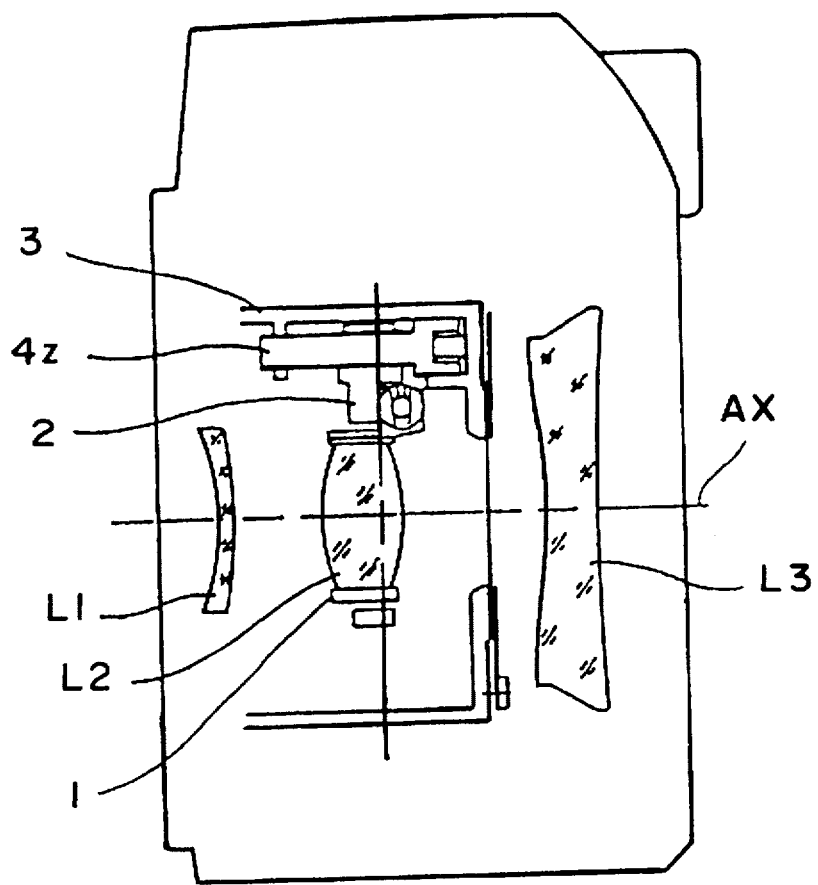
FIG. 1 is a side elevation of a camera main unit in which a camera shake compensation device of a first embodiment is incorporated.
Figures 2A, 2B:
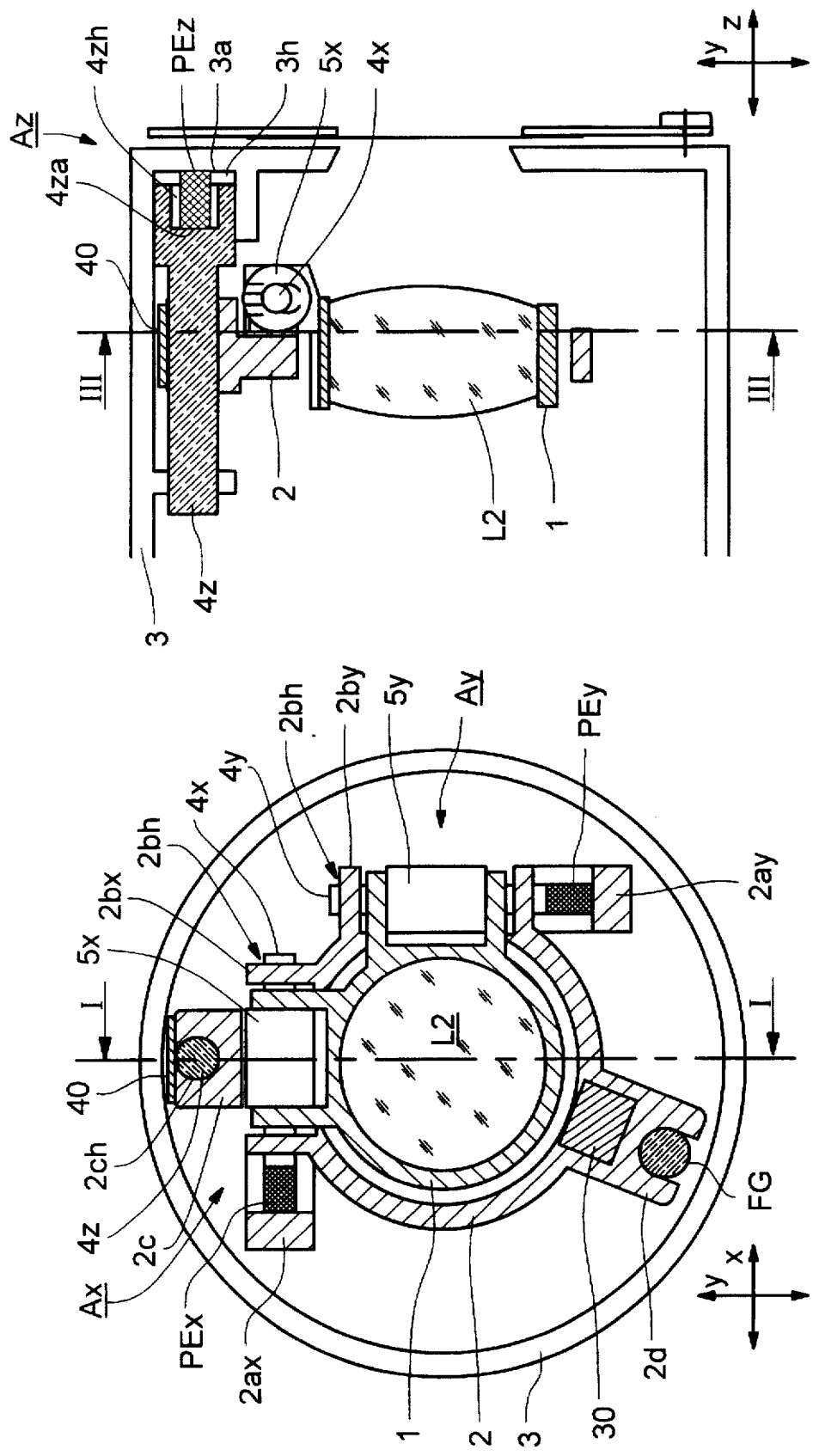
FIG. 2(a) is a cross-sectional view of the camera shake compensation device of the first embodiment.
FIG. 2(b) is a cross-sectional view of FIG. 2(a) taken along the I—I line, showing the construction of the focusing mechanism.
Figure 3A:
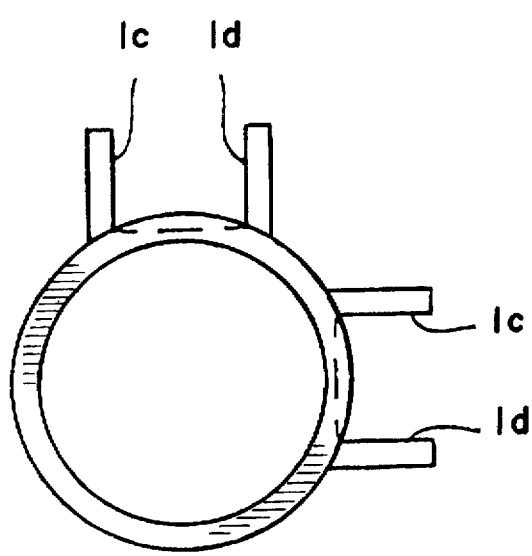
FIGS. 3(a) and 3(b) are a front elevation and a side elevation of the lens holder of the first embodiment.
Figure 3B:
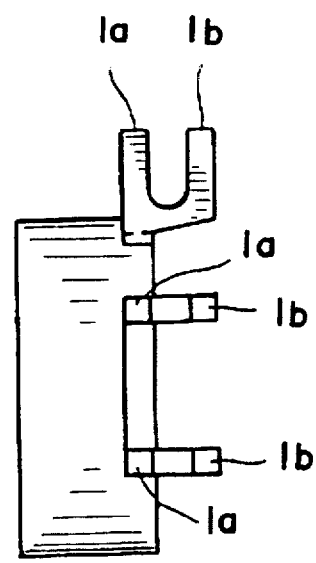
Figure 4A:
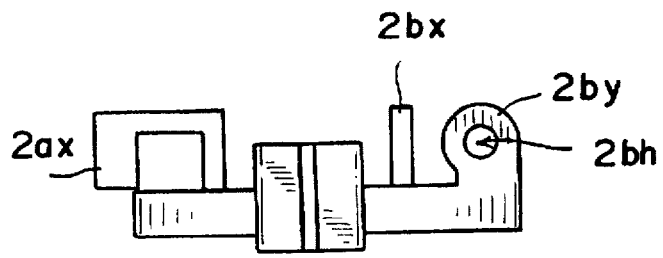
FIGS. 4(a), 4(b) and 4(c) are a plan view, a front elevation and a side elevation of the platform frame of the first embodiment.
Figure 4B:
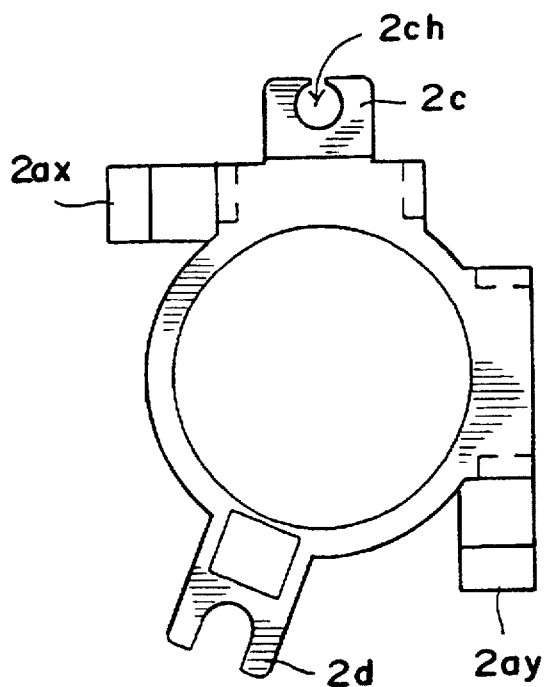
Figure 4C:
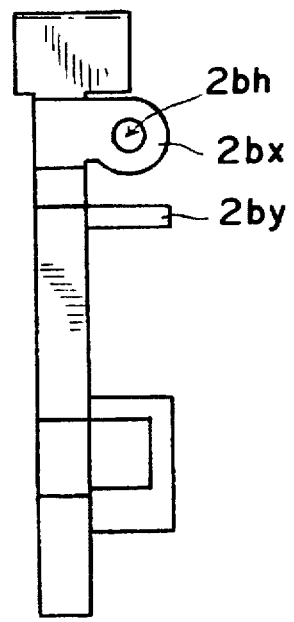
Figure 5:
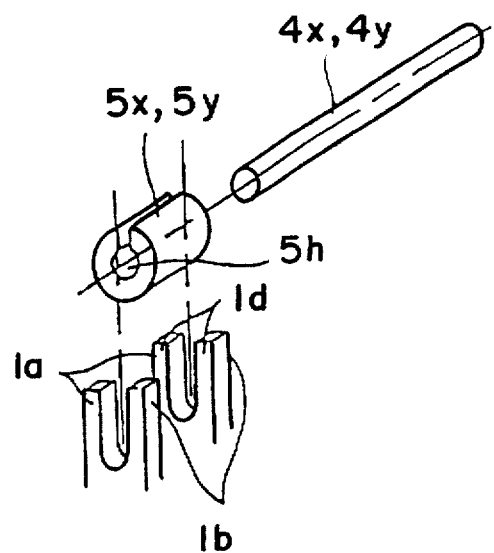
FIG. 5 is a perspective view showing how the moving element, rod and lens holder of the first embodiment are combined.

FIG. 1 is a cross-sectional side elevation of a camera main unit in which the camera shake compensation device is incorporated. FIG. 2(a) is a cross-sectional view of FIG. 2(b) taken along the III—III line, showing the construction of the camera shake compensation device. FIG. 2(b) is a cross-sectional view of FIG. 2(a) taken along the I—I line, showing the construction of the focusing mechanism. FIG. 3(a) is a front elevation of lens holder 1 and FIG. 3(b) is a side elevation of the same. FIG. 4(a) is a plan view, FIG. 4(b) is a front elevation and FIG. 4(c) is a side elevation of platform frame 2. FIG. 5 is a perspective view showing moving element 5x (5y), connector 1a (1b) and rod 4x (4y).

The camera shake compensation device of the first embodiment compensates for camera shake during photo-taking by causing camera shake compensation lens unit L2, which is a part of the photo-taking optical system comprising lens units L1 through L3, to move to become parallel and eccentric relative to this reference optical axis AX, as shown in FIG. 1. As shown in FIG. 2, said camera shake compensation device comprises lens holder 1 that holds camera shake compensation lens unit L2, impact actuators Ax and Ay to drive lens holder 1 in order to move camera shake compensation lens unit L2 to become parallel and eccentric and platform frame 2 that holds lens holder 1 via impact actuators Ax and Ay and that moves along reference optical axis AX (the z direction in FIG. 2(b)) together with lens holder 1 and impact actuators Ax and Ay during focusing by means of phototaking optical system lens units L1 through L3.

Said reference optical axis AX (FIG. 1) is the optical axis of the photo-taking optical system, which works as the basis for the camera shake compensation operation, i.e., is an optical axis common to lens units L1, L2 and L3 prior to the camera shake compensation operation. Therefore, movement of camera shake compensation lens unit L2 such that it may become parallel and eccentric relative to this reference optical axis AX means that camera shake compensation lens unit L2 is moved away from reference optical axis AX such that its optical axis after the movement does not coincide with but is parallel to reference optical axis AX.

As shown in FIG. 2(a), the camera shake compensation device comprises a lens holder 1, which constitutes the first holding member, and platform frame 2, which constitutes the second holding member, combined by means of two impact actuators Ax and Ay into one unit (hereinafter called 'the camera shake compensation drive unit'). Impact actuators Ax and Ay are used as the camera shake compensation drive source for the parallel eccentric movement described above, by which camera shake compensation lens unit L2 is driven in directions vertical to reference optical axis AX (namely, the x and y directions).

On the other hand, the movement of platform frame 2 during focusing is caused by impact actuator Az constituting the focusing mechanism described below. In other words, impact actuator Az is used as the focusing drive source. By driving platform frame 2 along reference optical axis Ax (namely, the z direction), the camera shake compensation drive unit is simultaneously moved for the purpose of focusing.

Principle of the impact actuator

The three impact actuators Ax, Ay and AZ described above are all piezoelectric linear actuators taking advantage of the form-changing property of a piezoelectric element under an application of voltage. The drive principle of this impact actuator is briefly explained below with reference to FIGS. 10 through 13.

Figure 10:
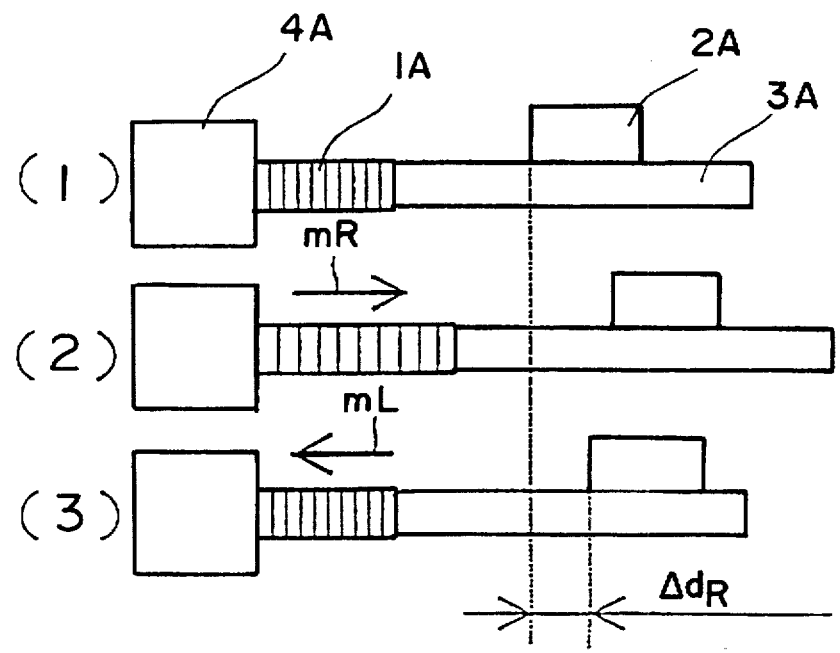
FIG. 10 is an illustration to explain the drive principle of an impact actuator (when the moving unit is moved to the right)

The impact actuator mainly comprises piezoelectric element 1A, moving unit 2A, drive shaft 3A and fixing member 4A, as shown in FIGS. 10(1) and 12(1). One end of piezoelectric element 1A is fixed to fixing member 4A, and drive shaft 3A is attached to its other end. Moving unit 2A is supported on drive shaft 3A via frictional force.

Figure 12:
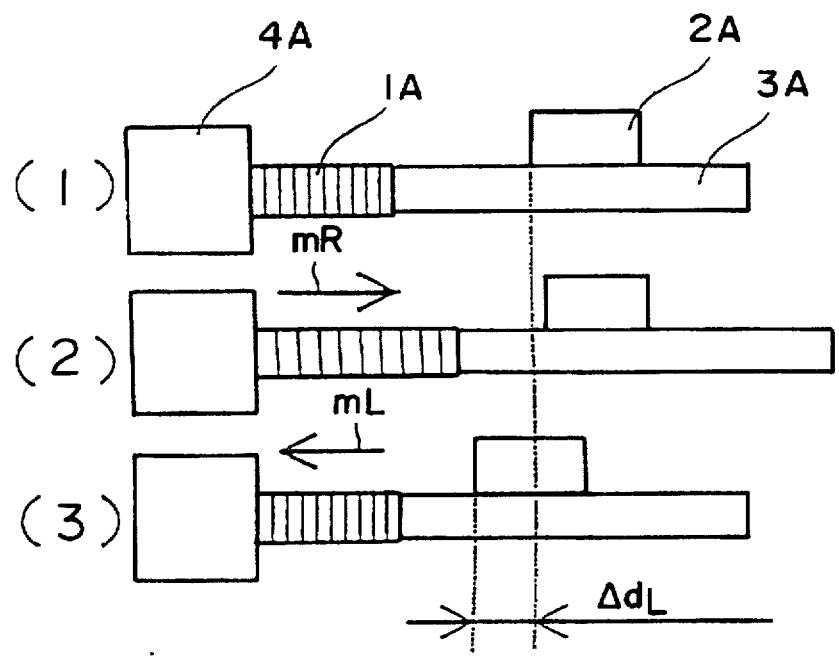
FIG. 12 is an illustration to explain the drive principle of an impact actuator (when the moving unit is moved to the left)
Figure 13:
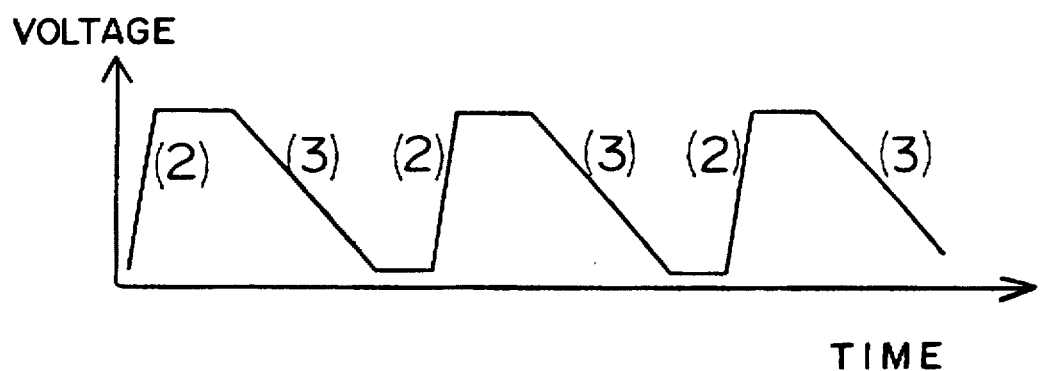
FIG. 13 is a time chart showing the drive voltage wave forms to realize the operation of the impact actuator shown in FIG. 12.

The impact actuator having this construction takes advantage of the rapid changes in form of piezoelectric element 1A and the inertial and frictional force of moving unit 2A such that moving unit 2A is moved to the left and right. By attaching to this moving unit 2A a driven object, that object can be moved. The drive operation of the impact actuator is explained below in the case where moving unit 2A is moved to the right (FIGS. 10 and 11) and in the case where moving unit 2A is moved to the left (FIGS. 12 and 13).

Where moving unit 2A is driven to the right (the direction of arrow mR)

Figure 11:
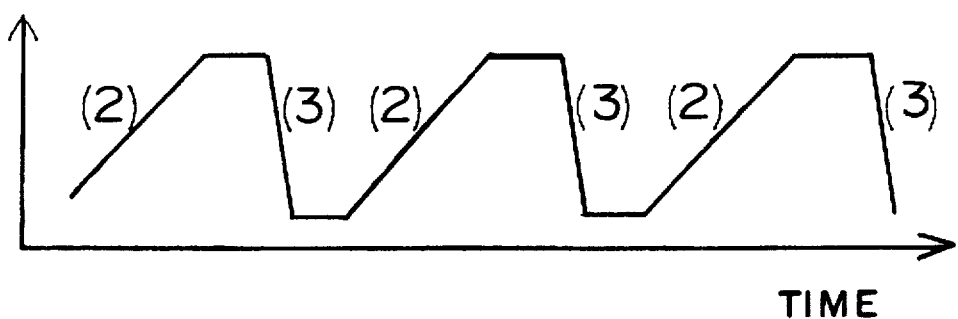
FIG. 11 is a time chart showing the drive voltage wave forms to realize the operation of the impact actuator shown in FIG. 10.

FIG. 10 shows the drive operation of the impact actuator when moving unit 2A is moved to the right (the direction of arrow mR) and FIG. 11 shows an example of wave forms of voltage applied to piezoelectric element 1A (drive voltage wave forms) when moving unit 2A is moved to the right. The rising edge (2) and the falling edge (3) in FIG. 11 correspond to the situations shown in FIGS. 10(2) and 10(3), respectively.

As shown in FIG. 10(1), drive pulses, each of which comprises a gradual rising edge (2) and a subsequent steep falling edge (3), are applied to piezoelectric element 1A. At the gradual rising edge (2) of the drive pulse, piezoelectric element 1A slowly extends along its length. As piezoelectric element 1A slowly extends, drive shaft 3A slowly moves to the right (the direction of arrow mR) along its axis, whereby moving unit 2A moves to the right together with drive shaft 3A due to the frictional force between moving unit 2A and drive shaft 3A (the situation shown in FIG. 10(2)).

On the other hand, at the steep falling edge (3) of the drive pulse, piezoelectric element 1A rapidly shrinks along its length. When piezoelectric element 1A rapidly shrinks, drive shaft 3A rapidly moves to the left along its axis (the direction of arrow mL). When this happens, moving unit 2A cannot follow the action of drive shaft 3A because of the inertia caused by its mass, and slides on drive shaft 3A despite the frictional force, and remains essentially stationary (the situation shown in FIG. 10(3)). By repeating the extension and shrinkage shown in FIGS. 10(2) and 10(3), moving unit 2A continuously moves to the right (ΔdR: amount of movement).

Where moving unit 2A is driven to the left (the direction of arrow mL)

By reversing the extension and shrinkage cycle of piezoelectric element 1A above (the case where moving unit 2A is moved to the right (the direction of arrow mR)), moving unit 2A can be moved to the left (the direction of arrow mL). FIG. 12 shows the drive operation of the impact actuator when moving unit 2A is moved to the left (the direction of arrow mL). FIG. 13 shows an example of wave forms of voltage applied to piezoelectric element 1A when moving unit 2A is moved to the left. The rising edge (2) and the falling edge (3) in FIG. 13 correspond to the situations shown in FIGS. 12(2) and 12(3), respectively.

The drive pulses, each of which comprises a steep rising edge (2) and a subsequent gradual falling edge (3), are applied to piezoelectric element 1A in the situation shown in FIG. 12(1). At the steep rising edge (2) of the drive pulse, piezoelectric element 1A rapidly extends along its length. When piezoelectric element 1A rapidly extends, drive shaft 3A rapidly moves to the right along its axis (the direction of arrow mR). When this happens, moving unit 2A cannot follow the action of drive shaft 3A because of the inertia caused by its mass and slides on drive shaft 3A despite the frictional force. As a result, it remains essentially stationary (the situation shown in FIG. 12(2)).

On the other hand, at the gradual falling edge (3) of the drive pulse, piezoelectric element 1A slowly shrinks along its length. As piezoelectric element 1A slowly shrinks, drive shaft 3A slowly moves to the left along its axis (the direction of arrow mL), whereby moving unit 2A moves to the left together with drive shaft 3A due to the frictional force between moving unit 2A and drive shaft 3A (the situation shown in FIG. 12(3)). By repeating the extension and shrinkage shown in FIGS. 12(2) and (3), moving unit 2A continuously moves to the left (Δdl: amount of movement)

Example of the impact actuator unit construction

Figures 14A, 14B:
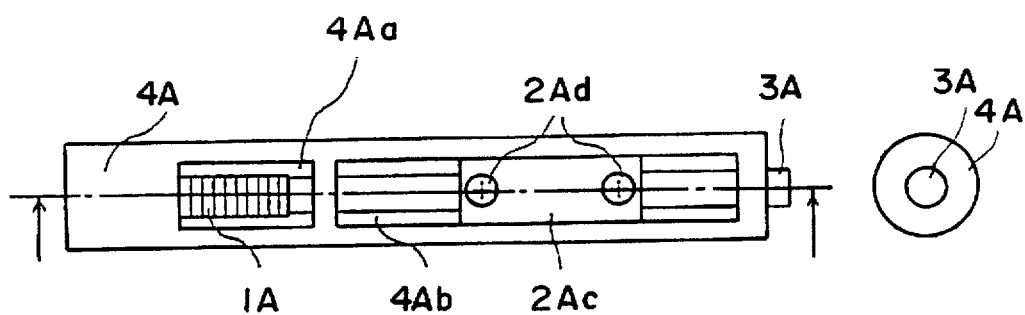
FIGS. 14(a), 14(b) and 14(c) are a plan view, side elevation and vertical cross-sectional view of an impact actuator.
Figure 14C:
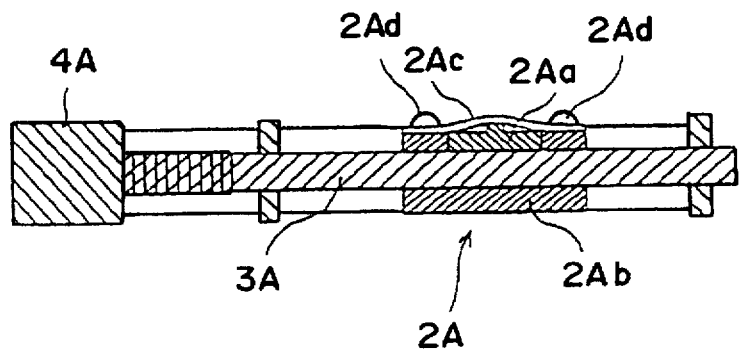

FIGS. 14(a) through 14(c) show an example of the construction of an impact actuator using piezoelectric element 1A. This impact actuator unit comprises piezoelectric element 1A, moving unit 2A (comprising friction member 2Aa, slider 2Ab, pressurizing spring 2Ac and screws 2Ad), drive shaft 3A and fixing member 4A. There are also a bearing for drive shaft 3A (not shown in the drawing), piezoelectric element attachment groove 4Aa and moving unit guide groove 4Ab inside fixing member 4A. Moving unit (slider 2Ab) 2A has a construction that allows a driven object to be attached. The camera shake compensation drive units mounted in the first and second embodiments have basically the same construction as the impact actuator shown in FIGS. 14(a) through 14(c), using which lens holder 1, platform frame 2 and lens holder 20, i.e., objects to be driven, may be driven.

The impact actuator explained above has characteristics itemized below as (a) through (d), for example. Therefore, by using said impact actuator, it is possible to increase the accuracy of the drive. In addition, the entire device can be easily made compact using a simple construction.

(a) Speed control can be performed via the voltage applied to the piezoelectric element. Both gross movement and precise movement are possible using a single drive system.

(b) Because the drive shaft and moving unit are connected via frictional force, highly accurate driving without clearance or backlash is possible.

(c) Because the moving unit stops moving due to friction, it can stably remain in one position and no energy is required to stop it.

(d) Differences in speed arising in accordance with the orientation of the impact actuator can be made small by increasing the frictional force relative to the mass of the moving unit.

Camera shake compensation drive unit

The camera shake compensation drive unit for the first embodiment will now be explained. The camera shake compensation drive unit comprises, as shown in FIG. 2(a), lens holder 1, platform frame 2, piezoelectric elements PEx and PEy, rods 4x and 4y, moving elements 5x and 5y, etc. Connectors 1a and 1b are formed on lens holder 1 (FIG. 3) as one unit, and fixing members 2ax and 2ay, bearings 2bx and 2by, connector 2c and guide member 2d are formed on platform frame 2 (FIG. 4) as one unit. Lens holder 1 and moving elements 5x and 5y are made of a softer material than that used for rods 4x and 4y.

In this camera shake compensation drive unit, piezoelectric elements PEx and PEy correspond to piezoelectric element 1A described above; moving elements 5x and 5y and connectors 1a and 1b correspond to moving unit 2A; rods 4x and 4y correspond to drive shaft 3A; and fixing members 2ax and 2ay correspond to fixing member 4A (FIG. 10, etc.). Lens holder 1 holding camera shake compensation lens unit L2 corresponds to the driven object. Therefore, impact actuator Ax comprises piezoelectric element PEx, moving element 5x, connectors 1a and 1b, rod 4x, fixing member 2ax, etc., while impact actuator Ay comprises piezoelectric element PEy, moving element 5y, connectors 1a and 1b, rod 4y, fixing member 2ay, etc.

As shown in FIGS. 3 and 5, since the distance between connectors 1a and 1b is smaller than the diameter of rod 4x (4y) (FIGS. 2 and 5), when rod 4x (4y) is sandwiched between connectors 1a and 1b, rod 4x (4y) is frictionally combined with connectors 1a and 1b via the elasticity of lens holder 1 itself. In other words, by simultaneously sandwiching two rods 4x and 4y, which are perpendicular to each other, between connectors 1a and 1b, respectively, lens holder 1 can be positioned on a plane perpendicular to reference optical axis AX (namely, the x-y plane).

In addition, as shown in FIG. 5, the inner diameter of moving element 5x (5y), which has a C-shaped cross-sectional configuration, is smaller than the diameter of rod 4x (4y). Rod 4x (4y) is also made of a harder material than that used for moving element 5x (5y). Therefore, when rod 4x (4y) is inserted in hole 5h of moving element 5x (5y), the inner surface of moving element 5x (5y) is made to suffer elastic deformation while it tightens around the outer surface of rod 4x (4y). In other words, moving element 5x (5y) is frictionally combined with rod 4x (4y) through its own elasticity such that it may move along the axis of rod 4x (4y).

On the other hand, one end of piezoelectric element PEx (PEy) is affixed to fixing unit 2ax (2ay) of platform frame 2 (FIG. 4), as shown in FIG. 2. Rod 4x (4y) is movably engaged in hole 2bh (FIG. 4) formed on bearing 2bx (2by), and one end of rod 4x (4y) is affixed to the other end of piezoelectric element PEx (PEy) affixed to fixing unit 2ax (2ay).

Moving element 5x (5y) is located between sides 1c and 1d of connectors 1a and 1b (FIG. 3(a)) as shown in FIG. 2(a). Therefore, when moving element 5x (5y) is driven using piezoelectric element PEx (PEy) based on the drive principle described above, lens holder 1 is pushed by moving element 5x (5y) on either side 1c or side 1d and moves. When this happens, even if moving element 5x is driven, because connectors 1a and 1b sandwiching rod 4y slide in the direction of the drive on the side of rod 4y, camera shake compensation drive in the lateral direction (the x direction in FIG. 2) is not hindered. This is true for the vertical direction (the y direction in FIG. 2) as well.

As described above, impact actuators Ax and Ay (FIG. 2) constituting the camera shake compensation drive source move lens holder 1 holding camera shake compensation lens unit L2 on a plane perpendicular to reference optical axis AX, as a result of which camera shake compensation lens unit L2 is moved such that its optical axis becomes parallel and eccentric relative to reference optical axis AX. The position of camera shake compensation lens unit L2 changes along both the x and y directions through this parallel eccentric movement. The post-movement position (hereinafter called 'parallel eccentric position') is detected by the combination of a pin hole plate, not shown in the drawings, an LED (light emitting diode), and a two-dimensional PSD (position sensing device).

The pin hole plate is fixed to lens holder 1, while the LED and two-dimensional PSD 30 (FIG. 2) are fixed to platform frame 2. The pin hole plate is positioned such that it is sandwiched between the LED and two-dimensional PSD 30. Therefore, the parallel eccentric position can be detected by reading where the light is shining as indicating the movement of the pin hole plate which is equal to the movement of lens holder 1 (in other words, the movement of the light coming through the pin hole).

Figure 15:
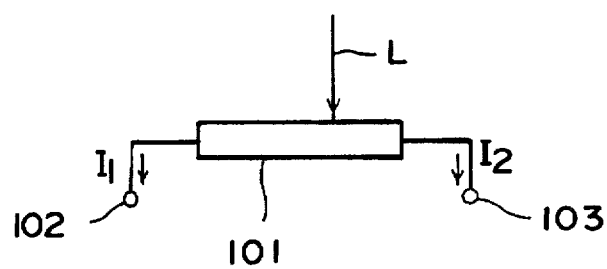
FIG. 15 is an illustration showing a one-dimensional PSD (position sensing device)
Figure 16:
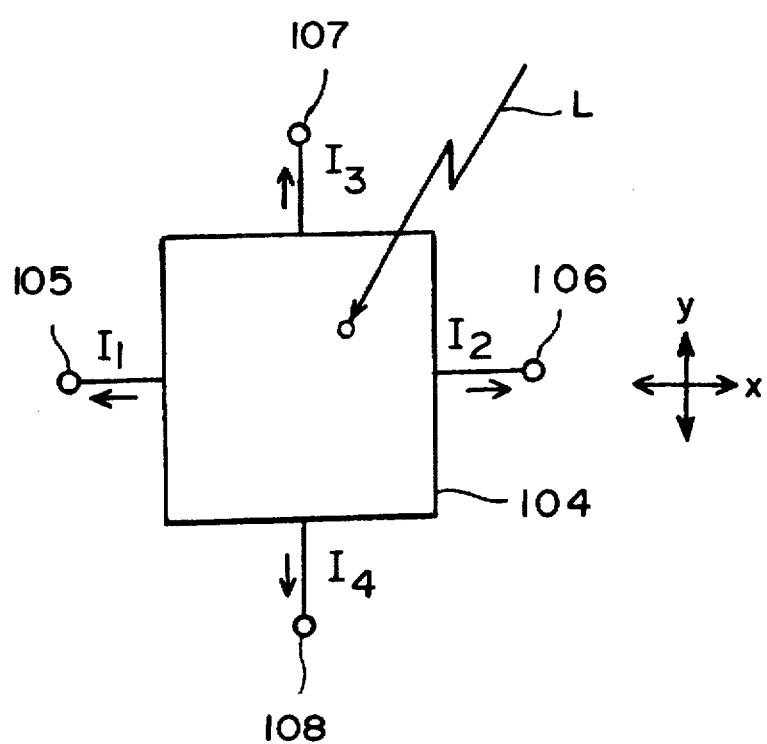
FIG. 16 is an illustration showing a two-dimensional PSD.

The principle of the PSD will now be explained briefly with reference to FIGS. 15 and 16. A PSD is an element which detects the area on which spot light L is shining when it is emitted. In the case of one-dimensional PSD 101 (FIG. 15), electric currents $I_1$ and $I_2$ that flow to terminals 102 and 103, respectively, change depending on where spot light L shines. Therefore, the point on which spot light L is shining can be detected by monitoring $I_1$ and $I_2$. If $I_1$ equals $I_2$, for example, it is determined that the point on which spot light L is shining is the center of PSD 101. The same principle is at work in the case of two-dimensional PSD 102 (FIG. 16) as well. In other words, the point on which spot light L is shining is expressed in terms of two directions which are perpendicular to each other (the x and y directions), and the lateral (x direction) position of the point on which spot light L is shining is detected by means of electric currents $I_1$ and $I_2$ that flow to terminals 105 and 106, respectively, while the vertical position of the point on which spot light L is shining is detected by means of electric currents $I_3$ and $I_4$ that flow to terminals 107 and 108, respectively.

Focusing mechanism

The focusing mechanism comprises, as shown in FIG. 2(b), platform frame 2, support frame 3, piezoelectric element PEz, focus rod 4z, etc. Support frame 3 supports platform frame 2 as shown in FIGS. 1 and 2, and a shutter unit (not shown in the drawings), and this support frame 3 moves along reference optical axis AX during zooming as well as when the lens mount collapses. Platform frame 2 is made of a softer material than that used for focus rod 4z.

In this focusing mechanism, piezoelectric element PEz corresponds to piezoelectric element 1A above; connector 2c corresponds to moving unit 2A above; focus rod 4z corresponds to drive shaft 3A above; and support frame 3 corresponds to fixing member 4A above (FIG. 10, etc.) In addition, platform frame 2 that supports lens holder 1 via impact actuators Ax and Ay corresponds to the driven object. Therefore, impact actuator Az comprises piezoelectric element PEz, connector 2c, focus rod 4z support frame 3, etc.

Connector 2c formed on platform frame 2 has hole 2ch which is smaller than the diameter of focus rod 42 as shown in FIG. 4(b). Focus rod 4z is made of a harder material than that used for platform frame 2. Therefore, as shown in FIG. 2(a), when focus rod 4z is inserted into this hole 2ch, the inner surface of connector 2c suffers elastic deformation while tightening around the outer surface of focus rod 4z. In other words, platform frame 2 is combined with focus rod 4z via friction by means of its own elasticity such that it may move along the axis of focus rod 4z.

As shown in FIG. 2(b), non-pierced hole 4zh is located on one end of focus rod 4z. One end of piezoelectric element PEz is affixed to bottom 4za of this hole 4zh. On the other hand, the other end of piezoelectric element PEz is affixed to bottom 3a of hole 3h of support frame 3. Said focus rod 4z is engaged in hole 3h of support frame 3 on the end where hole 4zh is located such that it may move along reference optical axis AX. In addition, in order for the extension and shrinkage of piezoelectric element PEz to be reliably transmitted to focus rod 4z, the depth of hole 4zh is adjusted so that there is a gap between focus rod 4z and bottom 3a of hole 3h in the area where they are engaged.

The camera shake compensation drive unit is moved along reference optical axis AX (the z direction) during focusing by impact actuator Az constituting the focusing drive source (FIG. 2) as described above and providing platform frame 2 with drive power. When this happens, because focus guide FG (fixed to the support frame) is engaged with guide member 2d formed on platform frame 2, the movement of platform frame 2 within the plane vertical to reference optical axis AX is restricted.

Incidentally, in the above embodiment, since camera shake compensation lens unit L2 is used as a focusing lens as well, focusing is performed using camera shake compensation lens unit L2 only. However, a construction in which focusing is performed by causing another lens unit to move in response to the movement of the camera shake compensation drive unit during focusing may be used. A construction in which the camera shake compensation drive unit is moved along reference optical axis AX during zooming by impact actuator Az providing platform frame 2 with drive power may also be used.

The position of camera shake compensation lens unit L2 changes along the z direction due to the movement of the camera shake compensation drive unit during focusing, and the post-movement position (hereinafter called the 'focus position') is detected by the combination of polarized focus rod 4z and magnetic resistance sensor 40 fixed on lens holder 1. This magnetic resistance sensor 40 is a magnetic sensor comprising a magnetic resistance element having the property that its resistance level changes when a magnetic field is applied. The detection of the parallel eccentric position above may also be performed by the combination of polarized rods 4x and 4y and magnetic resistance sensors fixed on moving elements 5x and 5y.

Effect of the first embodiment

As described above, in the camera shake compensation device proposed in U.S. Pat. No. 5,172,276, the camera shake compensation drive source (motor, etc.) is separately fixed to a fixed barrel, because of which a camera shake compensation drive mechanism to transmit the drive power of the camera shake compensation drive source to camera shake compensation lens unit L2 is needed. Further, because it is necessary that the construction allow the camera shake compensation drive mechanism to move along reference optical axis AX of the photo-taking optical system, the construction is complex.

In contrast, using the construction of the first embodiment, impact actuators Ax and Ay drive lens holder 1 that holds camera shake compensation lens unit L2 in order to move camera shake compensation lens unit L2 to become parallel and eccentric relative to reference optical axis AX. However, since platform frame 2 is supporting lens holder 1 via impact actuators Ax and Ay, lens holder 1 and impact actuators Ax and Ay are moved together along reference optical axis AX during focusing of the photo-taking optical system. Consequently, this movement during focusing can be accommodated without having a special drive mechanism to transmit the drive power from impact actuators Ax and Ay to lens holder 1. This helps reduce the number of components and makes the construction simple and compact.

In other words, in the first embodiment, to keep the construction simple, a drive mechanism for the transmission of drive power is made unnecessary by placing impact actuators Ax and Ay directly on lens holder 1 and platform frame 2. During focusing, by causing impact actuators Ax and Ay to move along reference optical axis AX together with camera shake compensation lens unit L2, a special design to accommodate the movement of camera shake compensation lens unit L2, etc. along reference optical axis AX is not necessary.

One of the characteristics of the first embodiment is that the impact actuators are placed on lens holder 1 and platform frame 2 as the camera shake compensation drive source, taking advantage of their compactness. In other words, because the impact actuator comprises a very light and compact piezoelectric element relative to a conventional DC motor, when the camera shake compensation drive source and focusing drive source are comprised of impact actuators Ax, Ay and Az as in the first embodiment, the entire camera shake compensation drive source becomes light and compact. Moreover, since the impact actuator performs driving using frictional combination, clearance which would reduce the accuracy of the camera shake compensation operation does not take place. Consequently, where the camera shake compensation drive source comprises impact actuators as in this embodiment, it is not necessary to use members such as gears which would give rise to clearance, and therefore highly accurate camera shake compensation can be performed.

Second embodiment

Figure 6:
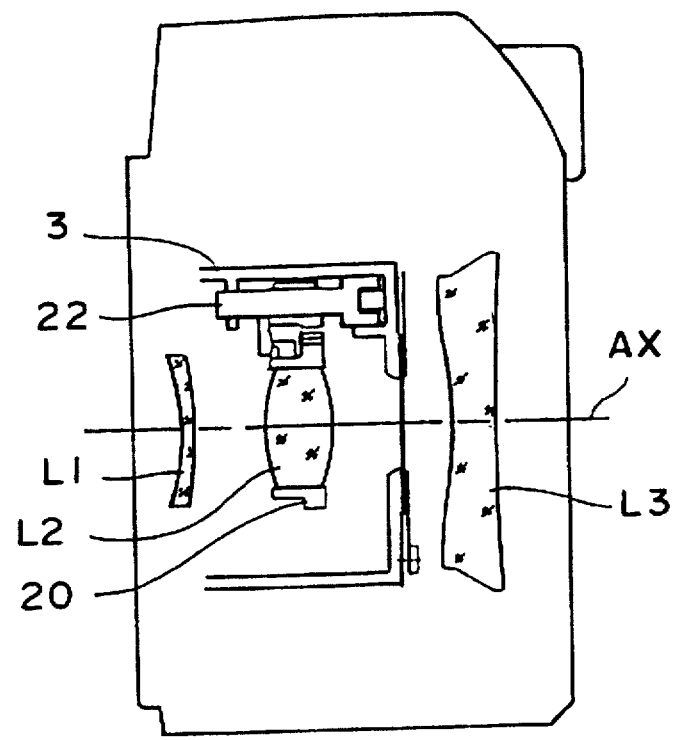
FIG. 6 is a side elevation of a camera main unit in which a camera shake compensation device of a second embodiment is incorporated.
Figure 7B:
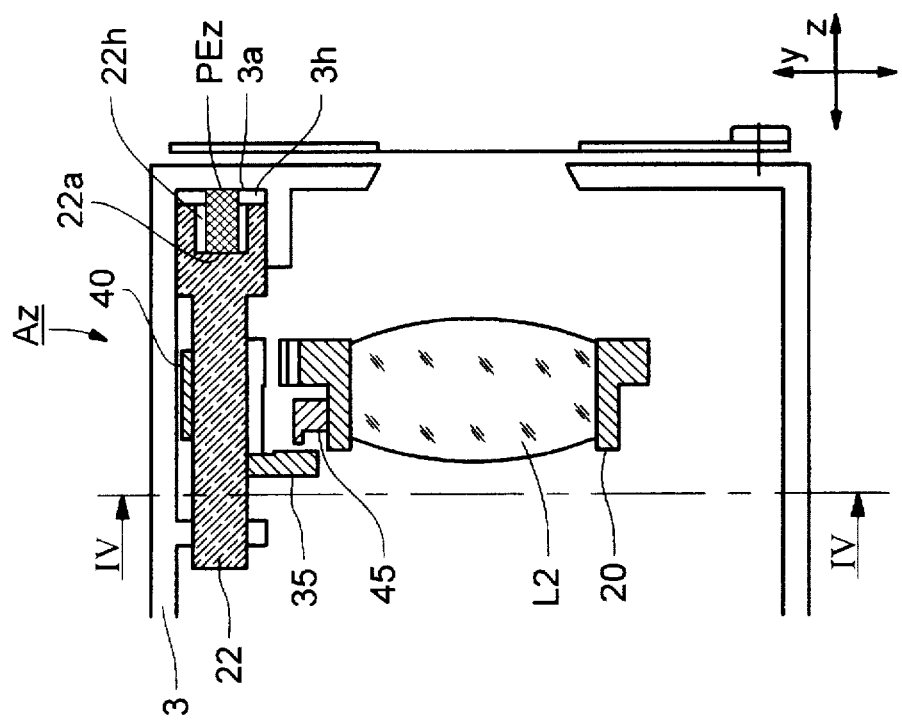
FIG. 7(b) is a cross-sectional view of FIG. 7(a) taken along the C—C line.
Figure 7A:
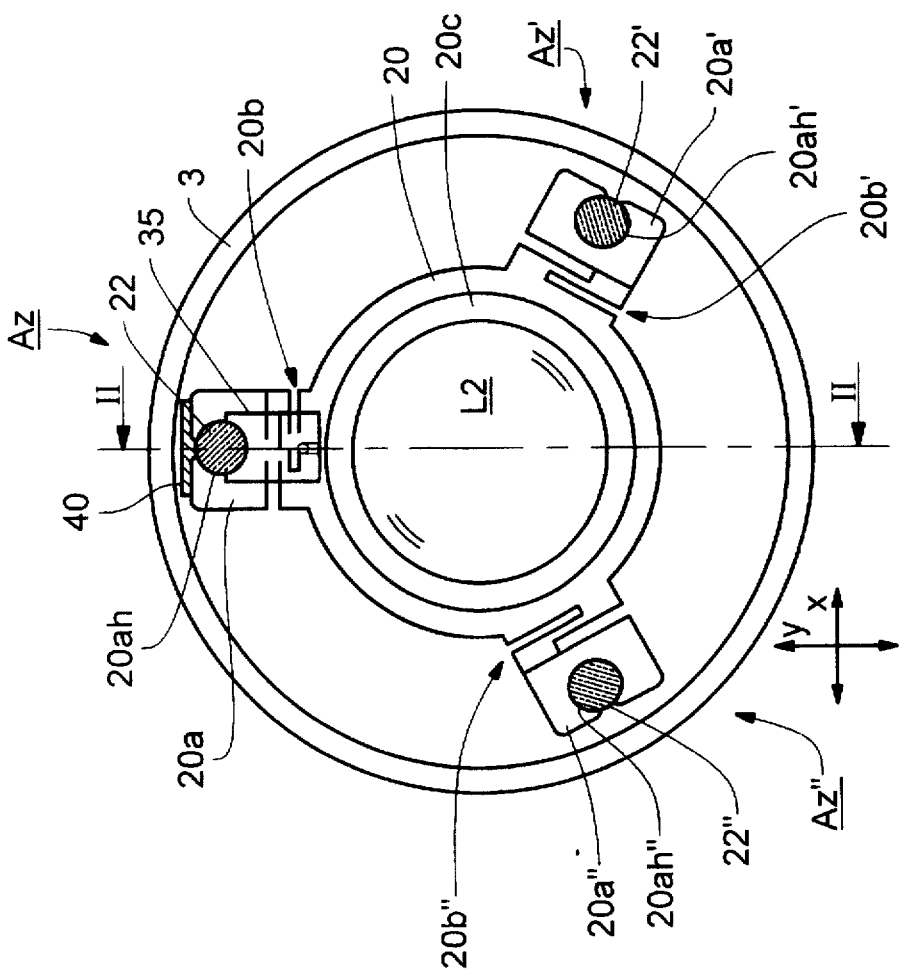
FIG. 7(a) is a cross-sectional view of the camera shake compensation device of the second embodiment.
Figure 8:
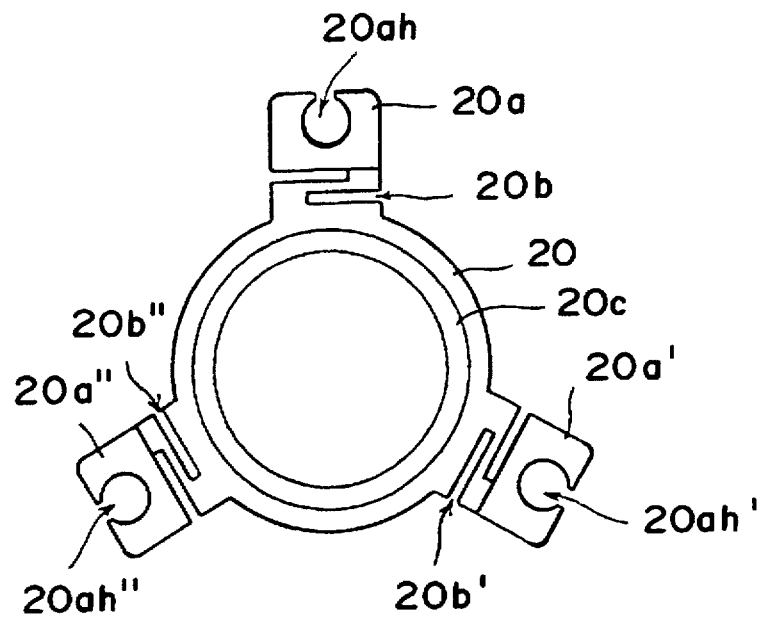
FIG. 8 is a front elevation showing the lens holder of the second embodiment.
Figure 9:
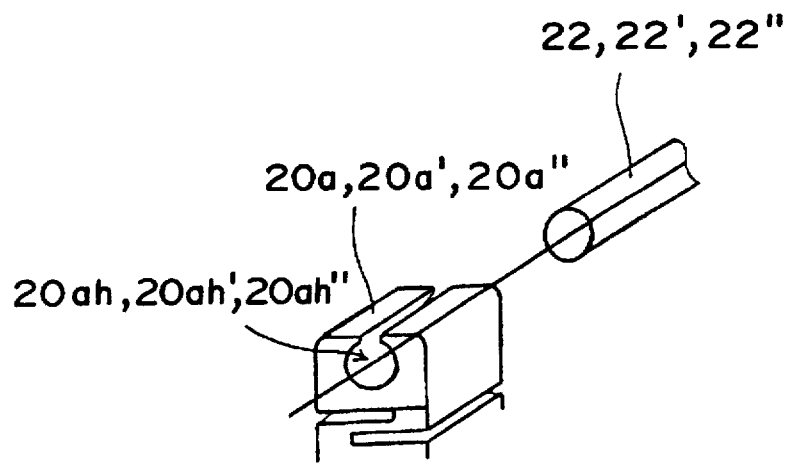
FIG. 9 is a perspective view showing how the rod and lens holder of the second embodiment are combined.

A second embodiment of a camera shake compensation device is explained below with reference to FIGS. 6 through 9. FIG. 6 is a side elevation of a camera main unit in which the camera shake compensation device of the second embodiment is incorporated. FIG. 7(a) is a cross-sectional view of FIG. 7(b) cut along the D—D line and FIG. 7(b) is a cross-sectional view of FIG. 7(a) cut along the C—C line. FIG. 8 is a front elevation of lens holder 20, and FIG. 9 is a perspective view showing how rod 22 (22', 22") and connector 20a (20a', 20a") of lens holder 20 are combined. Components which are identical or equivalent to those in the first embodiment (FIGS. 1 through 5) are given the same numbers and their detailed explanations are omitted.

The camera shake compensation device of the second embodiment is a camera shake compensation device that compensates for camera shake during photo-taking by means of tilting (making eccentric) relative to reference optical axis AX, the optical axis of camera shake compensation lens unit L2, which is a part of the photo-taking optical system comprising lens units L1 through L3 as shown in FIG. 6. Said camera shake compensation device of the second embodiment comprises lens holder 20, which is a support member to hold camera shake compensation lens unit L2, and impact actuators Az, Az' and Az" that drive lens holder 20 by providing it at three points with different amounts of drive power in the direction along reference optical axis AX (the z direction in FIG. 7) to tilt the optical axis of camera shake compensation lens unit L2 and that drive lens holder 20 by providing it at three points with the same amounts of drive power in the direction along reference optical axis AX (the z direction in FIG. 7) in order to perform focusing of the photo-taking optical system, wherein said impact actuators work as the optical axis-oriented drive source.

Said reference optical axis AX (FIG. 6) is the optical axis of the photo-taking optical system that works as the basis of the camera shake compensation operation as in the first embodiment, or in other words, is an optical axis common to lens units L1, L2 and L3 prior to the camera shake compensation operation. Therefore, tilting relative to this reference optical axis AX refers to movement of camera shake compensation lens unit L2 such that its optical axis is tilted at a certain angle relative to reference optical axis AX.

As shown in FIG. 7(a), the camera shake compensation device of the second embodiment is constructed such that three impact actuators Az, Az' and Az" provide lens holder 20 with adjusted amounts of drive power in the direction along optical axis AX (the z direction). Using this construction, impact actuators Az, Az' and Az" work both as the camera shake compensation drive source to tilt camera shake compensation lens unit L2 and as the focusing drive source for the photo-taking optical system. In other words, it may be said that the camera shake compensation device of the second embodiment is lens holder 20 and impact actuators Az, Az' and Az", which are made into one unit by means of support frame 3 (hereinafter called 'the optical axis-oriented drive unit'). These impact actuators Az, Az' and Az" are piezoelectric linear actuators taking advantage of the piezoelectric element's property that it changes in form when voltage is applied, and their drive principle is as described above (FIGS. 10 through 13).

Construction of the optical axis-oriented drive unit

The optical axis-oriented drive unit comprises, as shown in FIG. 7(b), lens holder 20, piezoelectric elements PEz (only that used for impact actuator Az is shown, and the other two are omitted in the drawings), rods 22, 22' and 22", support frame 3, etc.

On lens holder 20 (FIG. 8) are formed as one unit connectors 20a, 20a' and 20a", form-changing members 20b, 20b' and 20b", and lens holding member 20c. Lens holder 20 is made of a softer material than that used for rods 22, 22' and 22". Lens holder 20 and a shutter unit (not shown in the drawings) are supported by support frame 3 as shown in FIGS. 6 and 7. This support frame 3 moves along reference optical axis AX (the z direction) during zooming as well as when the lens mount collapses.

In the optical axis-oriented drive unit, piezoelectric element PEz corresponds to piezoelectric element 1A above; connectors 20a, 20a' and 20a" correspond to moving unit 2A above; rods 22, 22' and 22" correspond to drive shaft 3A above; and support frame 3 corresponds to fixing member 4A above (FIG. 10, etc.). Lens holder 20 holding camera shake compensation lens unit L2 by means of lens holding member 20c corresponds to the driven object. Consequently, impact actuator Az (Az', Az") comprises piezoelectric element PEz, connector 20a (20a', 20a"), rod 22 (22', 22"), frame 3, etc.

Connector 20a (20a', 20a") formed on lens holder 20 has hole 20ah (20ah', 20ah") smaller than the diameter of rod 22 (22', 22") (FIGS. 8 and 9). Rod 22 (22', 22") is made of a harder material than that used for lens holder 20. Therefore, when rod 22 (22', 22") is inserted in hole 20ah (20ah', 20ah") as shown in FIGS. 7(a) and 9, the inner surface of connector 20a (20a', 20a") suffers elastic deformation while tightening around the outer surface of rod 22 (22', 22"). In other words, lens holder 20 becomes frictionally combined with rod 22 (22', 22") via connector 20a (20a', 20a") due to its own elasticity such that it may move along the axis of rod 22 (22', 22").

To explain with reference to impact actuator Az, non-pierced hole 22h is located at one end of rod 22, as shown in FIG. 7(b). One end of piezoelectric element PEz is affixed to bottom 22a of this hole 22h. Furthermore, the other end of piezoelectric element PEz is affixed to bottom 3a of hole 3h of support frame 3. Said rod 22 is engaged in hole 3h of support frame 3 on the end where hole 22h is located, such that it can move along reference optical axis AX. In order for the extension and shrinkage of piezoelectric element PEz to be reliably transmitted to rod 22, the depth of hole 22h is adjusted so that there is a gap between rod 22 and bottom 3a of hole 3h in the area where they are engaged. This is also true regarding rods 22' and 22".

Camera shake compensation operation

When the three piezoelectric elements PEz are independently controlled and drive power is provided to connectors 20a, 20a' and 20a" based on the drive principle described above, lens holder 20 is pushed at each of the locations of its connectors 20a, 20a' and 20a". When this happens, where impact actuators Az, Az' and Az" (FIG. 7) are used as the camera shake compensation drive source, different amounts of drive power are applied to the three positions of lens holder 20 (namely, the locations of connectors 20a, 20a' and 20a") in the direction along reference optical axis AX (for example, this is achieved by starting the drive operations at different timings or using different speeds for the drive). As a result, the locations of three connectors 20a, 20a' and 20a" leave a plane perpendicular to reference optical axis AX, whereby lens holder 20 holding camera shake compensation lens unit L2 moves away from a plane perpendicular to reference optical axis AX. Consequently, the optical axis of camera shake compensation lens unit L2 becomes tilted relative to reference optical axis AX for the purpose of camera shake compensation.

When camera shake compensation lens unit L2 is tilted as described above, connectors 20a, 20a' and 20a" combined with rods 22, 22' and 22", respectively, no longer exist on a plane perpendicular to reference optical axis AX. This causes lens holding member 20c to undergo torsion, tilting, parallel movement, etc., which causes a reduction in accuracy of camera shake compensation as well as damage to lens holder 20. Form-changing members 20b, 20b' and 20b" formed between connectors 20a, 20a' and 20a" and lens holding member 20c, respectively, prevent said reduction and damage. They absorb and reduce the stress caused by said torsion, etc. undergone by lens holding member 20c.

By tilting the optical axis of camera shake compensation lens unit L2 as described above, the position of camera shake compensation lens unit L2 changes. The post-movement position (hereinafter called the 'tilted eccentric position') is detected by the combination of two-dimensional PSDs 35 described above and beam projectors 45. Since two-dimensional PSDs 35 are fixed to connectors 20a, 20a' and 20a", respectively, they maintain certain positional relationships relative to reference optical axis AX. On the other hand, since beam projectors 45 are fixed to lens holding member 20c, they move together with camera shake compensation lens unit L2. They project beams parallel to the optical axis of camera shake compensation lens unit L2 toward two-dimensional PSDs 35. Consequently, the tilted eccentric position can be detected by two-dimensional PSDs 35 reading the points on which the beams from beam projectors 45 are shining, which is interpreted as indicating the movement of lens holding member 20c.

Focusing operation

When three piezoelectric elements PEz are independently controlled and drive power is provided to connectors 20a, 20a' and 20a" based on the drive principle described above, lens holder 20 is pushed at each of the locations of its connectors 20a, 20a' and 20a". When this happens, where impact actuators Az, Az' and Az" (FIG. 7) are used as the focusing drive source, the same amounts of drive power in the direction along reference optical axis AX are applied to the three positions of lens holder 20, namely, the locations of connectors 20a, 20a' and 20a". This may be achieved by starting the drive operations at the same time using identical speeds. As a result, the three connectors 20a, 20a' and 20a" remain located on a plane perpendicular to reference optical axis AX, as a result of which lens holder 20 holding camera shake compensation lens unit L2 can be moved for the purpose of focusing while it remains on a plane perpendicular to reference optical axis AX. In other words, the optical axis of camera shake compensation lens unit L2 is kept identical to reference optical axis AX. Consequently, camera shake compensation lens unit L2 can be moved for focusing.

Because three impact actuators Az, Az' and Az", which comprise the optical axis-oriented drive unit, work as the camera shake compensation drive source and the focusing drive source in the camera shake compensation device of the second embodiment, it is difficult to perform the camera shake compensation operation and focusing operation simultaneously. It is therefore preferable to perform the camera shake compensation operation after completion of the focusing operation. For example, when the camera shutter release button is pressed half way down, the focusing operation is performed first and the camera shake compensation operation begins after the completion of the focusing operation and ends after the completion of exposure.

In this embodiment, since camera shake compensation lens unit L2 is used as the focusing lens, as well, focusing is performed using camera shake compensation lens unit L2 only. However, a construction in which focusing is performed by causing another lens unit to move in response to the movement of lens holder 20 during focusing may be used. A construction in which lens holder 20 is moved along reference optical axis AX during zooming by impact actuators Az, Az' and Az" providing lens holder 20 with drive power may also be used.

The position of camera shake compensation lens unit L2 along reference optical axis AX changes due to the movement of lens holder 20 during focusing. The post-movement position is detected by the combination of polarized rods 22, 22' and 22" and three magnetic resistance sensors 40 fixed to lens holder 20 (only rod 22 is shown in FIG. 7(b)). This magnetic resistance sensor 40 is a magnetic sensor as used in the first embodiment.

Effect of the second embodiment

As described above, impact actuators Az, Az' and Az" drive lens holder 20 by applying different amounts of drive power to three connectors 20a, 20a' and 20a" of lens holder 20 holding camera shake compensation lens unit L2 in the direction along reference optical axis AX such that the optical axis of camera shake compensation lens unit L2 becomes tilted relative to reference optical axis AX. In other words, they move camera shake compensation lens unit L2 eccentrically relative to reference optical axis AX. On the other hand, in order to perform focusing of the photo-taking optical system, camera shake compensation lens unit L2 is moved along reference optical axis AX through the driving of lens holder 20 by applying the same amounts of drive power to three connectors 20a, 20a' and 20a" of lens holder 20 in the direction of reference optical axis AX. Consequently, when compared with the camera shake compensation device proposed in U.S. Pat. No. 5,172,276, the movement along the optical axis during focusing can be accommodated without having a special drive mechanism to transmit drive power to the holding member from the optical axis-oriented drive unit that works as the camera shake compensation drive source. This helps reduce the number of components and makes the construction simple and compact.

In other words, in the second embodiment, a drive mechanism for the transmission of drive power is made unnecessary by using impact actuators Az, Az' and Az" as both the camera shake compensation drive source and the focusing drive source. Further, a special design to accommodate the movement of camera shake compensation lens unit L2, etc. along reference optical axis AX becomes unnecessary, making the construction very simple.

One of the characteristics of the second embodiment is that the impact actuators are placed on lens holder 20 as the camera shake compensation drive source, taking advantage of their compactness. Namely, because the impact actuator comprises a piezoelectric element that is very light and compact relative to the conventional DC motor, when impact actuators Az, Az' and Az" are used as both the camera shake compensation drive source and the focusing drive source, the entire optical axis-oriented drive source becomes light and compact. Moreover, since an impact actuator performs driving using frictional combination, clearance which would reduce the accuracy of the camera shake compensation operation does not occur. Consequently, where the optical axis-oriented drive source comprises impact actuators as in this embodiment, it is not necessary to use members such as gears which would cause clearance, and therefore highly accurate camera shake compensation operation and focusing operation can be performed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera shake compensation device for a photo-taking optical system, comprising:

a shake compensation optical element having an optical axis;

a first holding member that holds said shake compensation optical element in a plane that is substantially perpendicular to the optical axis;

a drive source that drives said first holding member in order to cause said shake compensation optical element to move such that the optical axis of the shake compensation optical element becomes eccentric with respect to an optical axis of the photo-taking optical system, said drive source arranged in the plane of the shake compensation optical element; and a second holding member that holds said first holding member by means of said drive source so that the second holding element can move along a photo-taking optical axis together with said first holding member and drive source during focusing or zooming by said photo-taking optical system.

2. The camera shake compensation device as claimed in claim 1, wherein the shake compensation optical element is a part of the photo-taking optical system.

3. The camera shake compensation device as claimed in claim 1, wherein the drive source includes a piezoelectric actuator.

4. The camera shake compensation device as claimed in claim 3, further comprising another piezoelectric actuator which drives the second holding member.

5. The camera shake compensation device as claimed in claim 1, further comprising a piezoelectric actuator which drives the second holding member.

6. The camera shake compensation device as claimed in claim 1, wherein the drive source includes first and second drivers for driving the first holding member, wherein the first driver drives the holding member in a first direction perpendicular to a second direction in which the second driver drives the holding member, wherein the first and second directions are perpendicular to the optical axis.

7. A camera shake compensation device for a photo-taking optical system, comprising:

a shake compensation optical element having an optical axis;

a holding member that holds said shake compensation optical element;

a first drive source that drives said holding member in order to cause said shake compensation optical element to move such that its optical axis becomes tilted with respect to an optical axis of the photo-taking optical system; and a second drive source that drives said holding member along the photo-taking optical axis during focusing or zooming by said photo-taking optical system.

8. The camera shake compensation device as claimed in claim 7, wherein the shake compensation optical element is a part of the photo-taking optical system.

9. The camera shake compensation device as claimed in claim 7, wherein the first drive source includes a piezoelectric actuator.

10. The camera shake compensation device as claimed in claim 7, wherein the second drive source includes a piezoelectric actuator.

11. The camera shake compensation device as claimed in claim 9, wherein the second drive source includes a piezoelectric actuator.

12. The camera shake compensation device as claimed in claim 7, wherein the optical axis of the shake compensation optical element is not parallel to the optical axis of the photo-taking optical system when the optical axis of the shake compensation optical element becomes tilted.

13. The camera shake compensation device as claimed in claim 7, wherein the second drive source includes means for focusing the photo-taking optical system by moving the shake compensation optical element.

14. The camera shake compensation device as claimed in claim 7, wherein the second drive source includes means for zooming the photo-taking optical system by moving the shake compensation optical element.

15. A camera shake compensation device for a photo-taking optical system, comprising:

a shake compensation optical element having an optical axis;

a holding member that holds said shake compensation optical element; and a drive source that operates in a first mode and a second mode, wherein when operating in said first mode, said drive source drives said holding member in order to cause said shake compensation optical element to move such that its optical axis becomes tilted with respect to an optical axis of the photo-taking optical system and when operating in said second mode, said drive source drives said holding member along the photo-taking optical axis during focusing or zooming by said photo-taking optical system.

16. The camera shake compensation device as claimed in claim 15, wherein the shake compensation optical element is a part of the photo-taking optical system.

17. The camera shake compensation device as claimed in claim 15, wherein the drive source includes a plurality of impact actuators.

18. The camera shake compensation device as claimed in claim 15, wherein the drive source includes three impact actuators arranged around a periphery of said shake compensation optical element.

* * * * *